Feb. 2, 1954    L. S. WHITSON ET AL    2,668,023
TAPE WINDING
Filed Oct. 29, 1947    12 Sheets-Sheet 1

Inventors
Lee S. Whitson,
Mathias G. Tometz AND
Bernard G. Ferlaak, Jr.
By
Attorneys

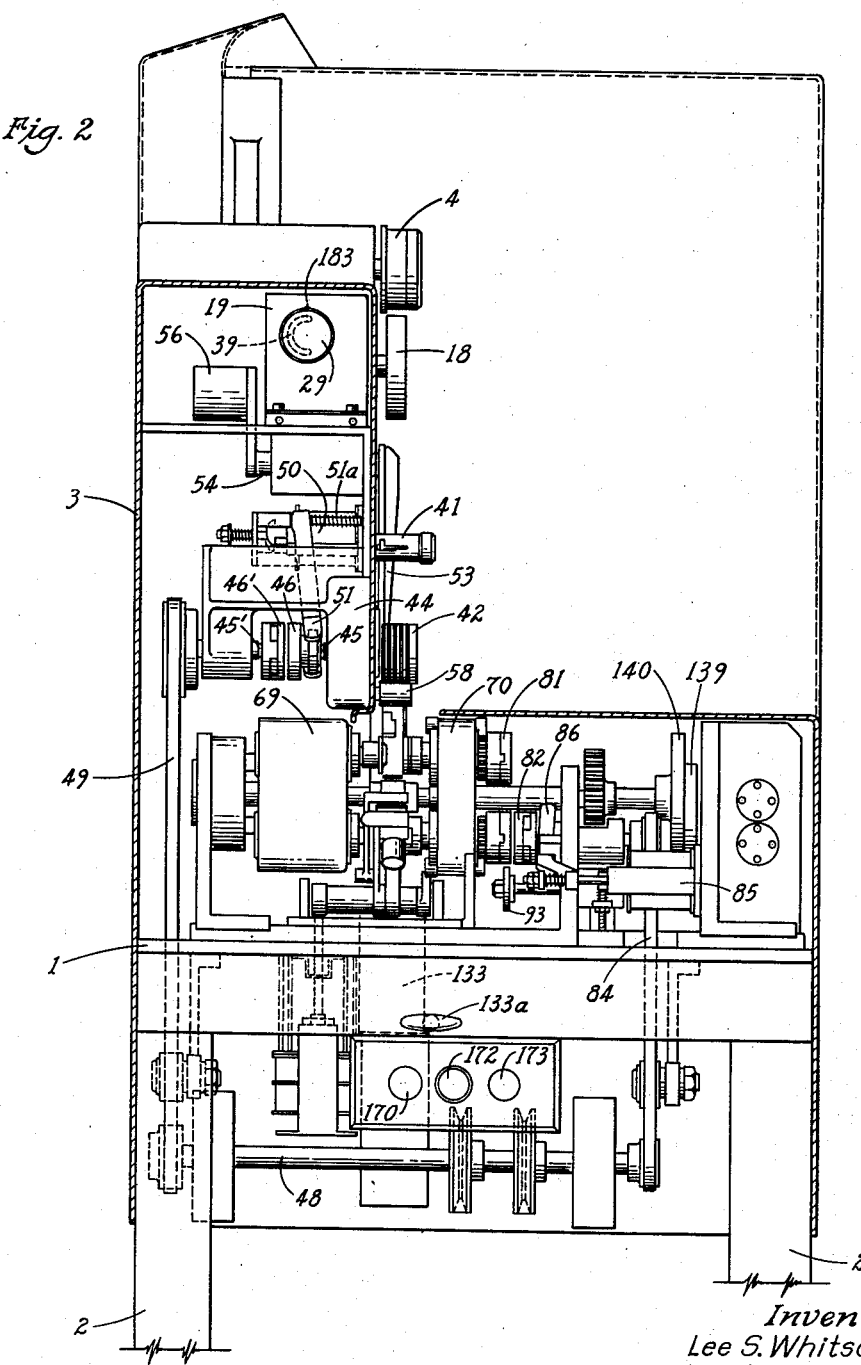

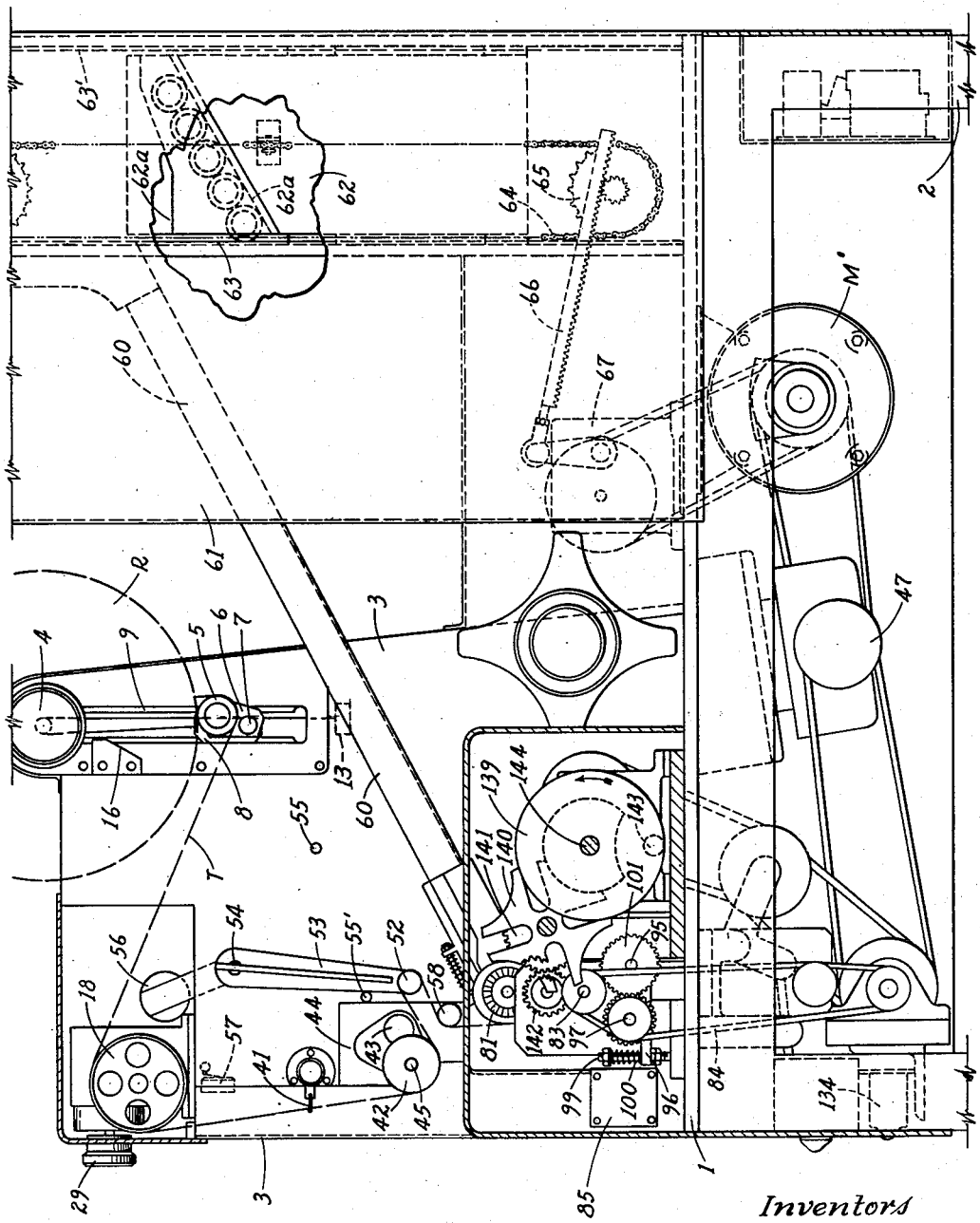

Feb. 2, 1954 — L. S. WHITSON ET AL — 2,668,023
TAPE WINDING
Filed Oct. 29, 1947 — 12 Sheets-Sheet 4
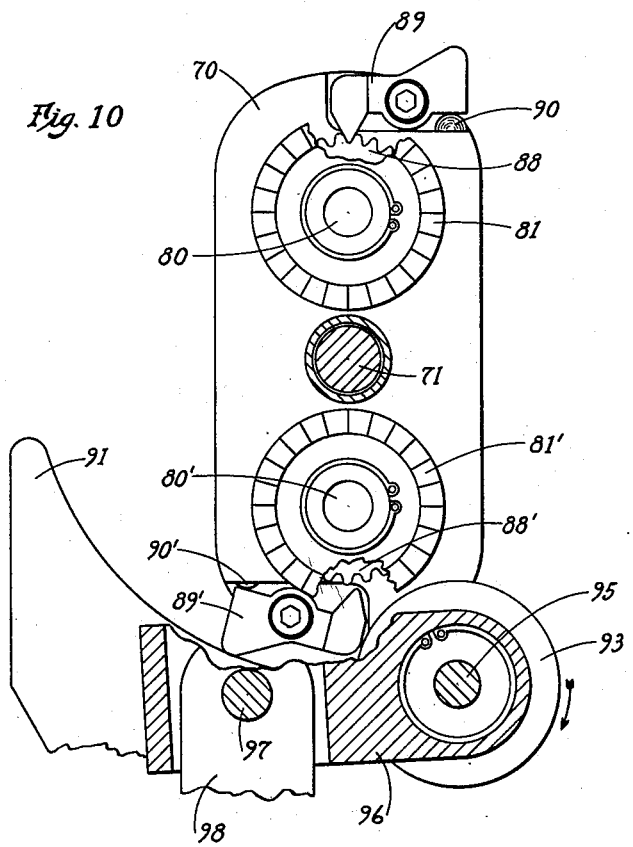
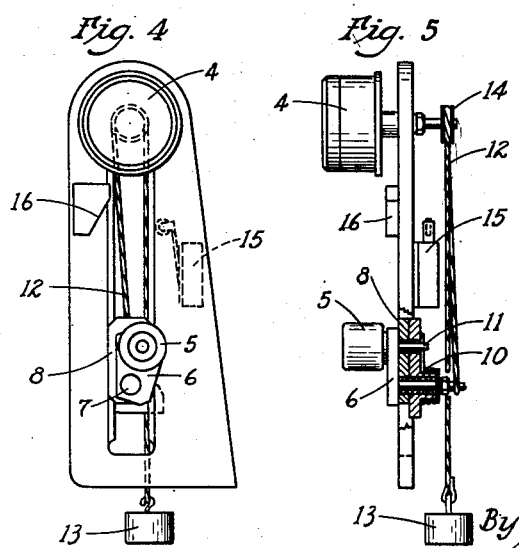
Inventors
Lee S. Whitson,
Mathias G. Tometz, and
Bernard G. Ferlaak, Jr.
Attorneys

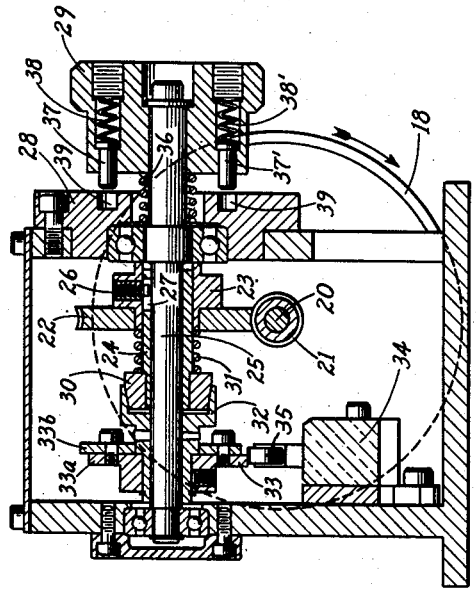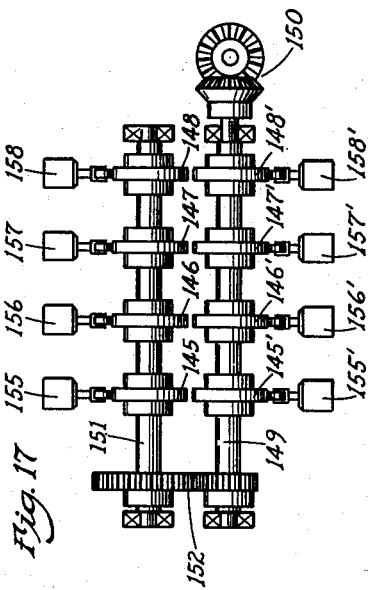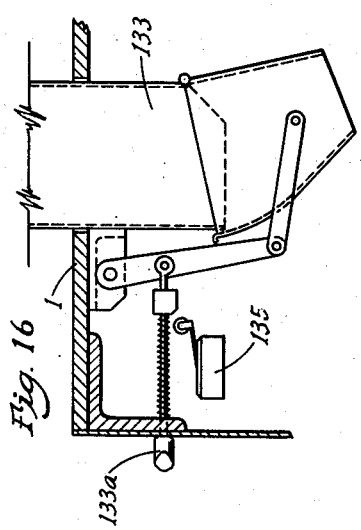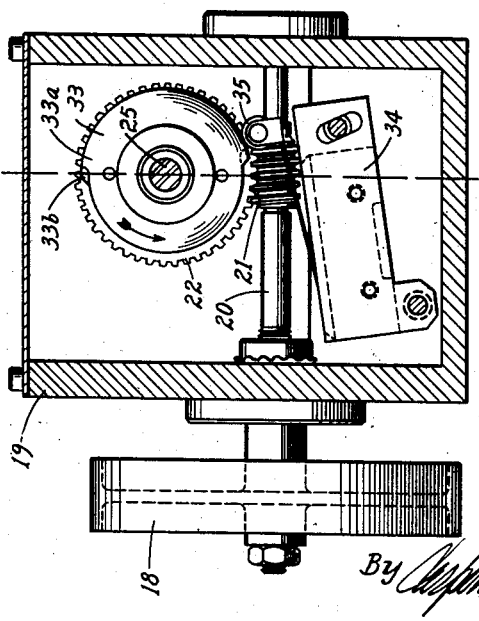

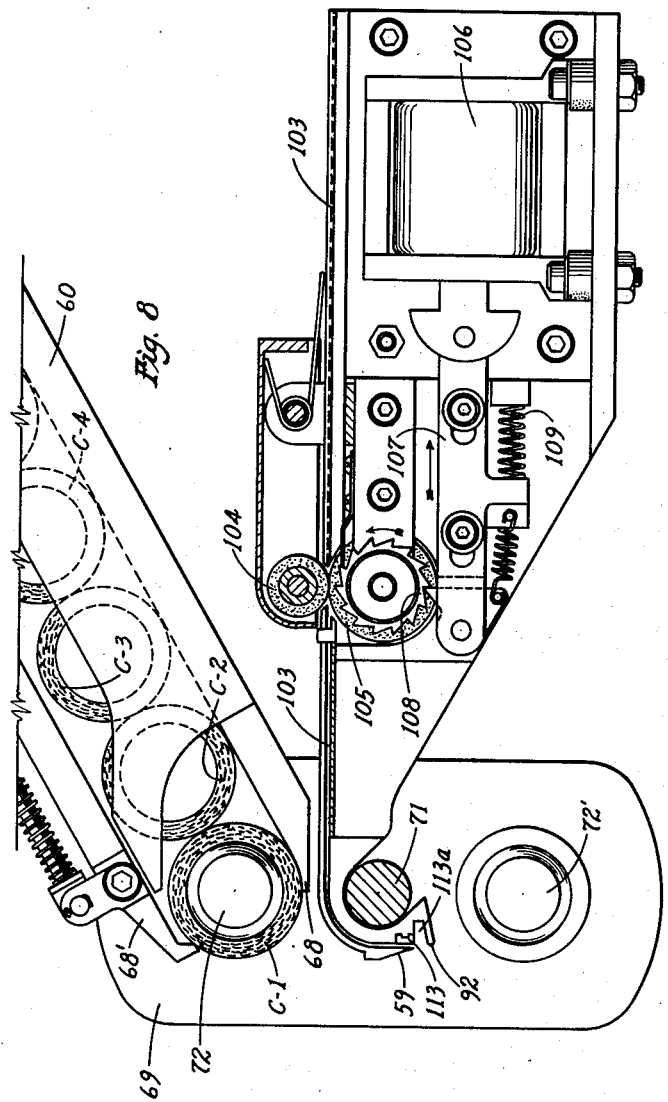

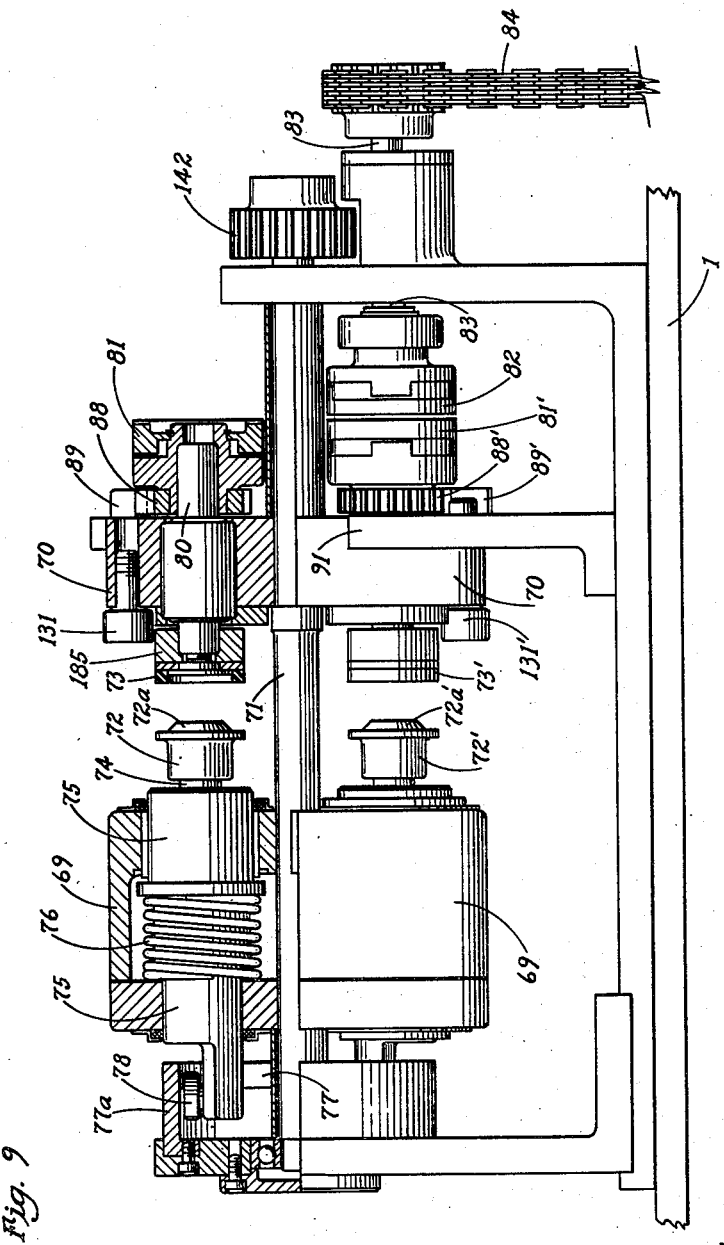

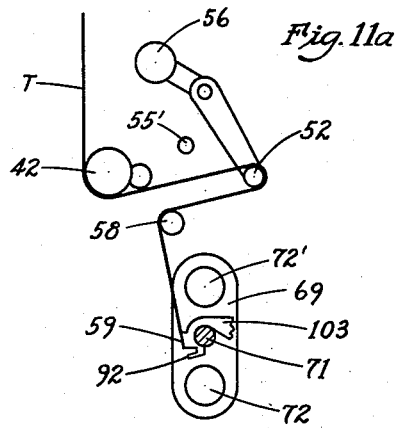
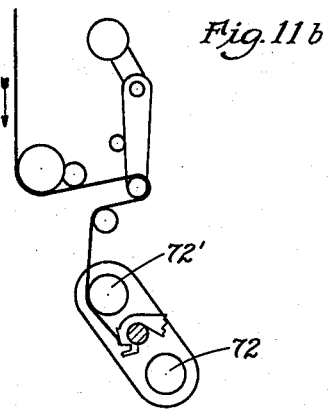
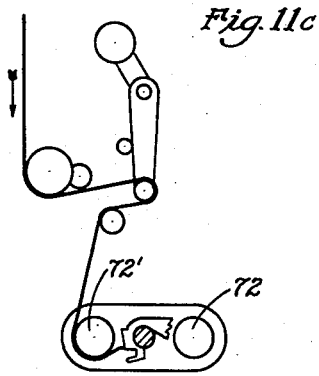
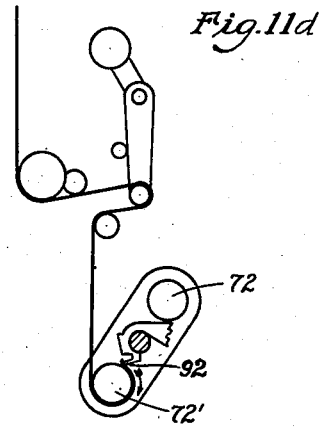
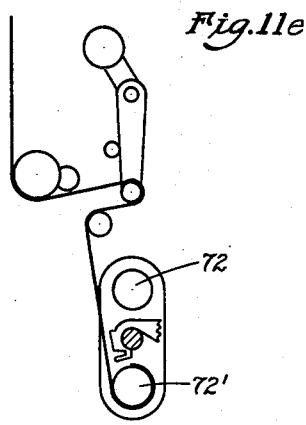

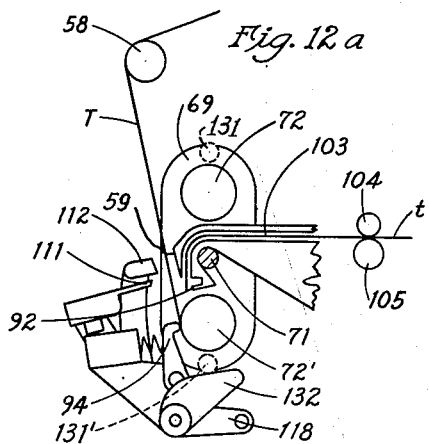
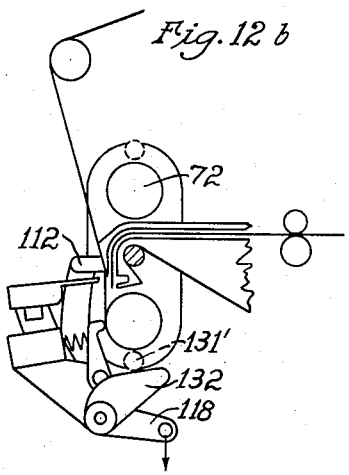
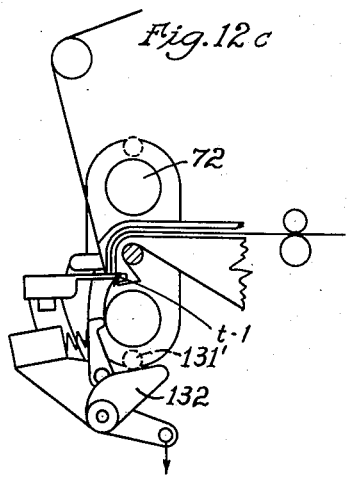
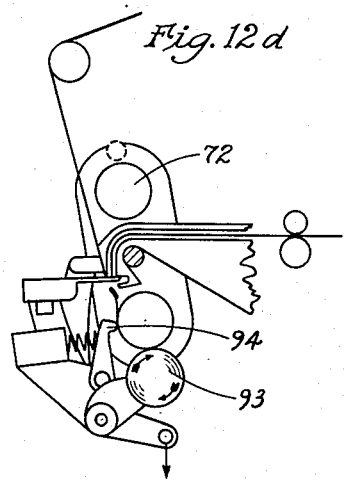
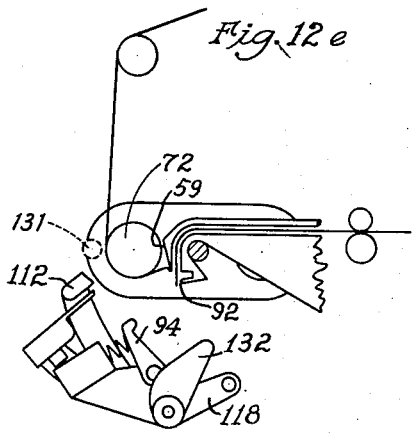

Feb. 2, 1954 L. S. WHITSON ET AL 2,668,023
TAPE WINDING
Filed Oct. 29, 1947 12 Sheets-Sheet 11

Inventors
Lee S. Whitson,
Mathias G. Tometz and
Bernard G. Ferlaak, Jr.
By *Carpenter Abbott Coulter & Kinney*
Attorneys

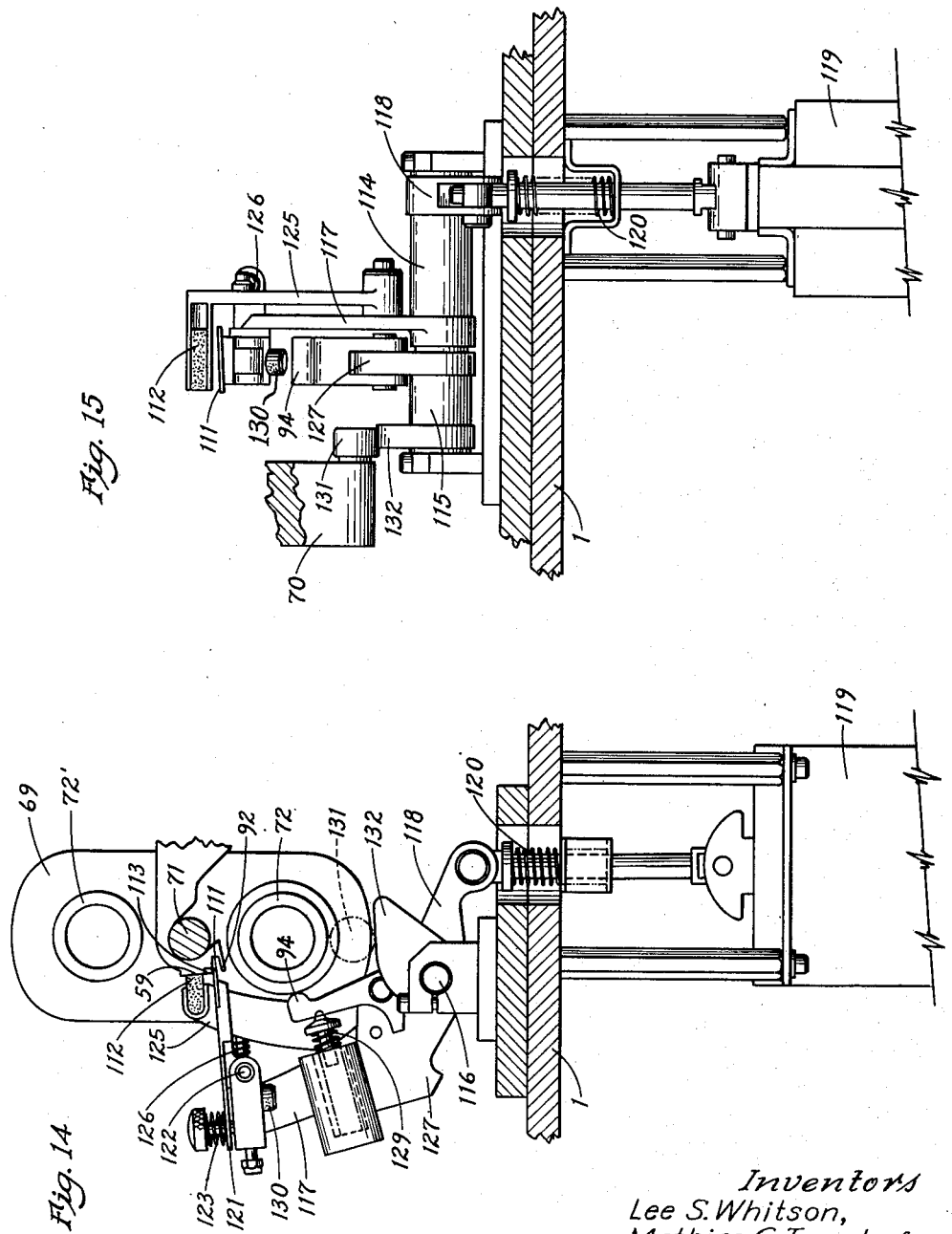

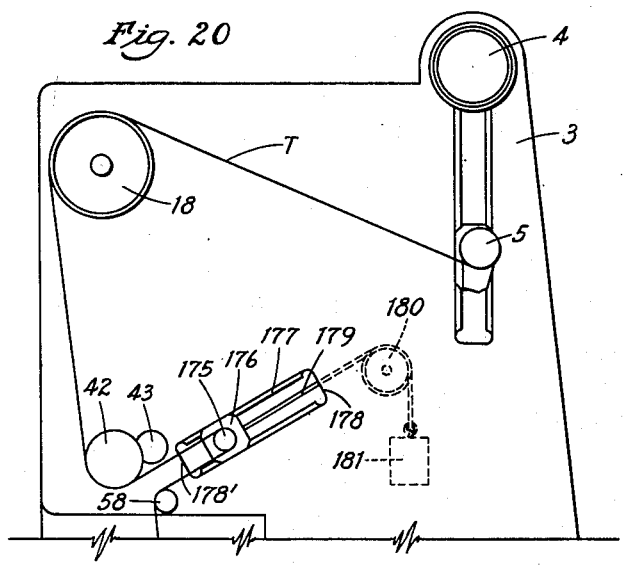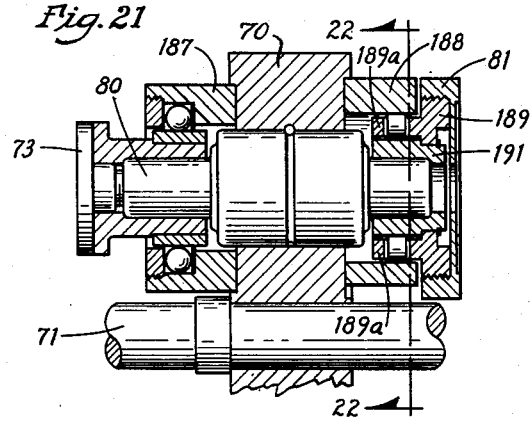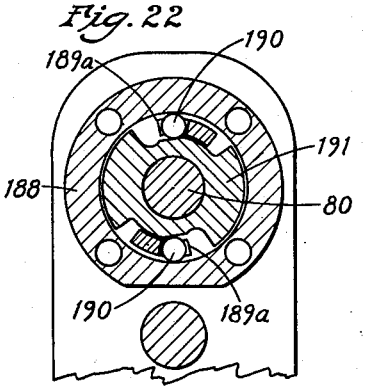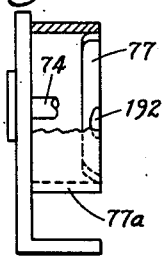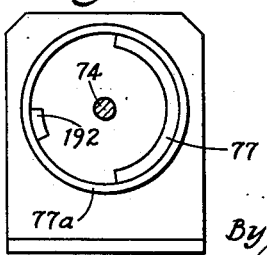

Patented Feb. 2, 1954

2,668,023

UNITED STATES PATENT OFFICE 2,668,023

TAPE WINDING

Lee S. Whitson, Mathias G. Tometz, and Bernard G. Ferlaak, Jr., Minneapolis, Minn., assignors to Minnesota Mining & Manufacturing Company, St. Paul, Minn., a corporation of Delaware Application October 29, 1947, Serial No. 782,744

17 Claims. (Cl. 242—56)

This invention relates to machines for winding rolls of tape, particularly to machines for winding in succession a large number of rolls of relatively short lengths of tape from a relatively large supply thereof.

Prior machines known to us require manual mounting and positioning of the empty cores or spools and their manual removal after the short lengths of tape have been wound on, the machines having to be stopped for these operations after each winding. This is costly in terms of manual time and effort and idle machine time.

Included, therefore, among the important objectives is the provision of a winding machine that is substantially fully automatic, requiring a minimum of manual attention and with a minimum of idle time; a machine that will operate at relatively high speeds; a machine that will produce smoothly wound well aligned rolls, also rolls in which the initial wrap is smoothly laid down without wrinkle or doubling, rolls equipped with a removal tab at the trailing end of the tape.

The present invention provides a machine comprising means for rotatably holding a tape roll core, means for holding a supply of tape, means for measuring the tape as it is withdrawn from the supply, means for releasably anchoring the leading end of a withdrawn unsevered length near the core holder, means for advancing the core holder to bring the periphery of the core into contact with the unsevered length, means for rotating the core to wind tape onto the core, and means for severing the tape adjacent the core after a measured length has been wound on.

It also provides means for feeding a succession of cores to the core holder, means associated with the holder for seizing a core that is fed to the holder, means for compensating for variance between the rate of feeding and the rate of winding and for maintaining an approximately uniform tension on the advanced unsevered length, means for holding the core fixed against rotation for a period during its continued advancement after contact with the tape, wiping means which the core engages as it continues to advance to wipe the leading end of the tape down around the core's periphery, means for bringing the succeeding unsevered length of tape into engagement with the anchoring means, means for severing the tape between the anchoring means and the core after the measured length has been wound on, means for applying a tab to the trailing end of the cut length, means for wiping down the trailing end around the filled core, means for releasing the filled core from the holder, and means for discharging it into a suitable receptacle.

It also provides timing mechanisms, electrical circuits and signals for rendering the operations automatic and in proper sequence and for automatically coordinating the parts when starting the machine and for automatically stopping it when the stock roll is exhausted or when the tape breaks in winding and for counting the wound rolls exclusive of rejected rolls.

The invention is exemplified by a machine for automatically winding a succession of relatively short rolls of pressure-sensitive adhesive tape from a relatively large supply roll thereof, which is described below and is illustrated in the accompanying drawings in which:

Figures 2 and 3 are front and side elevations;

Figures 4 and 5 are side and rear elevations of the snub roll and automatic stop assembly;

Figure 6 is a rear elevation of the measuring mechanism;

Figure 7 is a sectional view of the measuring mechanism taken on the line 7—7 in Figure 6;

Figure 8 is a side elevation of the core supply chute and tabbing mechanism;

Figure 9 is a front elevation of the winding mechanism;

Figure 10 is a right elevation of the right chuck head;

Figures 11a, 11b, 11c, 11d and 11e are diagrams showing successive positions of certain parts during the affixing of the initial wrap of tape upon a core;

Figures 12a, 12b, 12c, 12d and 12e are diagrams showing successive positions of certain parts during winding, and during and after cutting;

Figures 14 and 15 are side and rear elevations of the cutting and wiping mechanism;

Figure 16 is a side elevation of the roll discharge chute;

Figure 17 is a diagram of the timing cams and switches;

Figure 20 is a side elevation of an alternative form of the dancing roll assembly;

Figures 21 and 22 are sectional views of an alternative form of chuck head employing overrunning clutches; and Figures 23 and 24 are front and side elevations of an alternative form of chuck opening cams.

*Tape supply*

Figure 1:
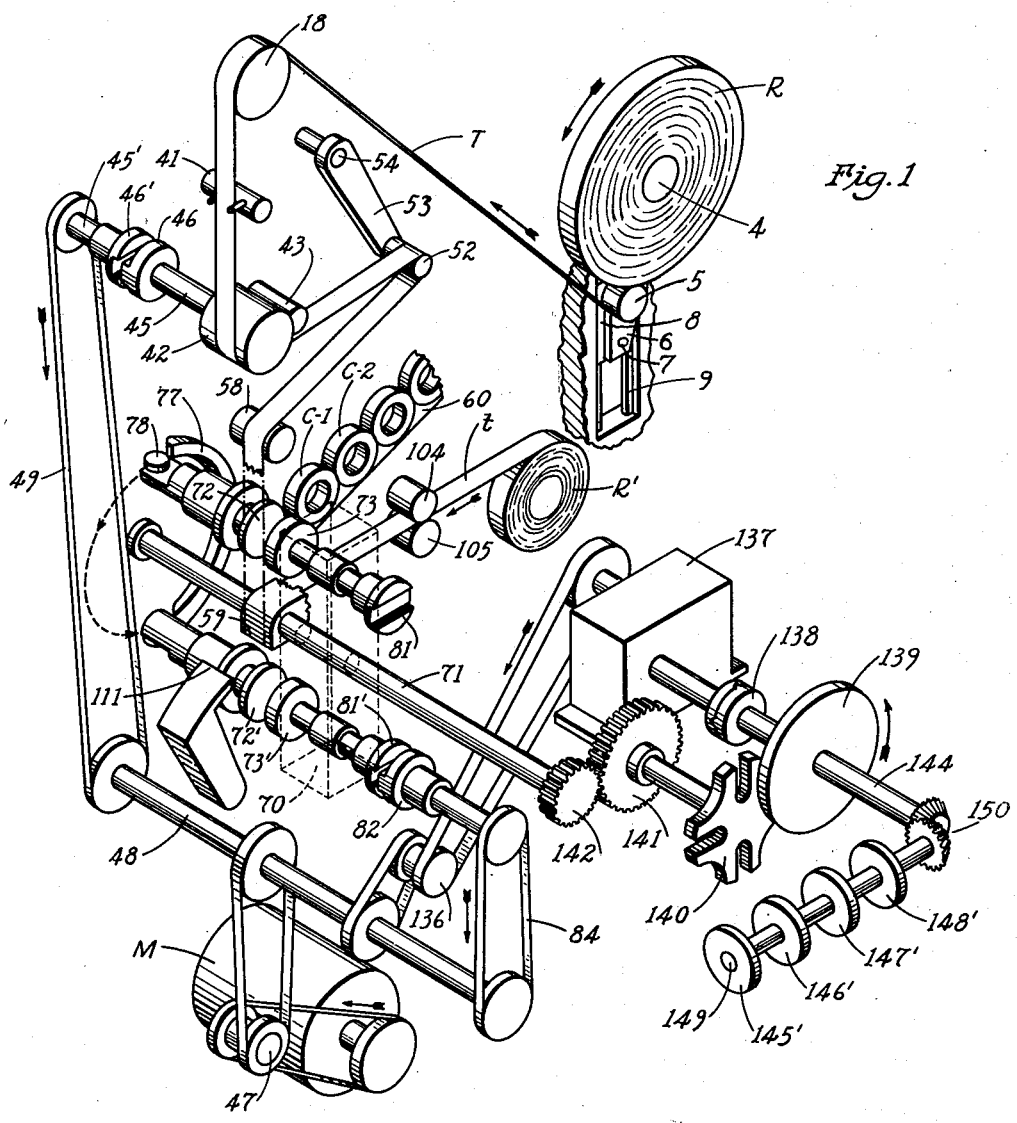
Figure 1 is a schematic diagram in perspective of certain parts of the machine.

The tape supply mechanism is supported by a frame 3 which extends upwardly from a table having a planar top 1 and legs 2. A drum 4 for holding a supply roll R of pressure-sensitive adhesive tape T (which is the "stock tape," i. e., the tape to be wound into small rolls), is rotatably mounted at the top and rear of the frame 3.

A snub roller 5 bears against the periphery of the supply roll R. It is rotatably mounted on the end of an arm 6 which is pivotally mounted at 7 on a sliding block 8, which latter reciprocates in a vertical slot 9. A torsion spring 10 concentric with the shaft 7 impels the arm 6 clockwise, and a stop pin 11 limits the arm against further clockwise movement at the arm's normal position shown in Figure 4. The tape T is led from the stock roll R around the snub roller 5 (tacky side out) so that withdrawal of the tape impels the arm 6 counterclockwise. A sudden increase in tension such as occurs during periods of acceleration, displaces the roller 5 against the force of the spring 10, thereby preventing much of the increase from being a direct pull on the tape. The snub roller assembly thus functions as a shock absorber to aid in preventing breakage.

It also functions as an automatic stop to halt the machine when the supply roll is empty. A pressure by the snub roller upwardly against the supply roll is maintained by a counterweighted cable 12 attached to the sliding block 8 and to a counterweight 13, and running over a suitable pulley 14. At the correct height, the block actuates a switch 15 to stop the machine when the supply roll R is nearly exhausted, e. g., when less than enough tape to make up one of the small rolls r remains. The slanting edge of a guide plate 16 limits the counterclockwise movement of the arm 6 as the block 8 nears the top of its movement, to maintain a fixed relative position between the roller 5 and the block when the latter is about to trip the switch 15.

From the snub roller 5, the tape is next led around the periphery (tacky side in) of a tally wheel 18 which operates a measuring mechanism in the housing 19 that is attached to the upper forward portion of the frame 3.

The tally wheel 18 is driven at a peripheral speed equal to the lineal speed of the tape by reason of the tape's temporary adherence to the wheel's periphery. The wheel is demountably fixed to a shaft 20 which is journaled on ball bearings in the two opposite sides of the tally housing 19. A worm 21 fixed to the shaft 20 drives a worm gear 22 having a hub 23 which fits freely on a sleeve 24, the latter being carried by a cam shaft 25 and fitting freely thereon. A pin 26 is screwed into the hub 23 and projects into a longitudinal slot 27 in the sleeve 24 so that the sleeve can slide freely along the shaft 25 in relation to the worm gear 22 but cannot rotate in relation thereto. The shaft 25 is journaled on ball bearings in a side of the housing at its one end and at its other end in a cam setting plate 28 which is set into the opposite side. The shaft 25 extends outside the housing beyond the plate where it is keyed for a knob 29.

The sleeve 24 carries at its end a cone 30. A coil spring 31 between the cone and the worm gear 22 continuously presses the cone into engagement with a cone clutch 32 so that the clutch is normally engaged. The clutch 32 is pinned to the shaft 25, and carries a cam 33 which is fastened thereto by set screws. The worm gear 22 (driven by the tally wheel 18) thus drives the cam 33 through the cone clutch 32.

A single pole double throw micro switch 34, having a roller contact point 35 is positioned so that during 180° of rotation of the cam 33, the contact wheel 35 is depressed (as in Figure 6), while during the succeeding 180° it is allowed by the cam to raise to its normal position. When depressed it closes one circuit and opens the other; when raised it opens the one circuit and closes the other. The switch 34 controls the solenoids that operate the pull drum and winding clutches (in a manner hereinafter described) so that with a tally wheel 18 of a given circumference and a worm and worm wheel of a given ratio, a given length of tape will be fed and wound for every 180° of turn of the cam 33. The cam 33 is in two parts 33a and 33b to permit the adjustment or alteration of its periphery to the shape that will produce a desired timing of switch actuations.

The re-set knob 29 is keyed to the cam shaft 25 with a sliding fit. It is impelled outwardly away from the housing by a spring 36. Shoulder pins 37 and 37' fit freely in two bores in the knob 180° apart. Springs 38—38' in the bores impel the pins toward the cam setting plate 28 which is set into the side or wall of the housing 19. When the knob is pushed in towards the housing, either pin 37 or 37' will fit into an arc shaped groove 39 that is cut in the plate 28 concentric with the knob and shaft 25. The groove is of such length that the knob may turn 180° when one of the pins it in it. Upon such turning, the worm gear 22 will remain fixed, being in mesh with the worm 21, but the cone clutch 32 will slip and the cam 33 will be turned. The cam is set so that when the pin (37 or 37') that is in the arc shaped groove 39 has been turned by the knob so as to bear against one end of the groove, one circuit in the switch 34 is made and the other broken, and vice versa when the same pin bears against the other end of the groove 180° away.

Thus, regardless of the position of the tally wheel 18, the tally mechanism can be set so as to operate a full cycle and pass a full length of tape simply by pushing the re-set knob 29 inwardly against the cam setting plate 28, turning it in the proper direction as far as it will go (i. e., until one of the pins 37 or 37' bears against one end of the groove) and then releasing the knob so that it may be thrust back out again by the spring 36. The manner of determining the proper direction in which to turn the knob is described hereinafter in the section on Operation.

The housing 19 is held in the frame 3 by fastenings that permit its positional adjustment to align the tally wheel with the drum 4 and other parts.

From the tally wheel 18 the tape is next led around the periphery (tacky side in) of a power driven pull drum 42, passing first through an adjustable tape guide member 41. The drum is power driven and supplies the force by which the tape is withdrawn from the supply roll R. A smaller secondary pull drum 43 withdraws the tape from the main drum 42. The drums act to pull the tape by reason of its temporary adherence to their peripheries. The peripheries of both drums are finned, and they are sufficiently close to each other so that their fins enmesh. The drums are fixed to shafts which are connected by gearing in the gear box 44 of a ratio to give the two drums the same direction and peripheral speed. It is sometimes advantageous to rotate the second drum at a peripheral speed slightly greater than the first.

The left end (Figure 2) of the drum shaft 45 carries a toothed clutch member 46. Facing the plate 46 is a complementary clutch member 46' on the end of a shaft 45' which is in line with the shaft 45. The shaft 45' is continuously driven by a motor M through a variable speed changer 47, countershaft 48 and a chain 49. The hub of the clutch member 46 and the shaft 45 are splined so that the member 46 may be moved into and out of engagement with the member 46'. Such movement is accomplished by the solenoid 50 acting through the clutch fork 51. The clutch member 46 is held by the fork spring 51a in a normally disengaged position. It is moved into engagement by the solenoid when the latter is energized.

From the pull drums 42 and 43 the tape is next led around a dancing roller 52 (tacky side out) which is rotatably mounted at the end of a dancing arm 53. The arm is pivoted at 54 to swing between stops 55 and 55', the counterweight 56 acting to make the arm normally bear counterclockwise against the stop 55, the pull of the tape at the winding chucks acting to impel the arm clockwise toward the stop 55'. The pull of the counterweight is preferably such as to keep the arm from touching either stop when tape is being moved through the machine, particularly during the winding of a roll, and sufficient to strip the tape from the second pull drum 43 as it is being drawn through the machine. Thus the dancing roll mechanism functions to maintain a substantially uniform tension on the tape between the pull drums and the winding chucks whenever it is being fed.

The lineal speed of the tape past the pull drums 42 and 43 is constant, but at the point of winding it increases from a speed slower than the drum speed to a speed faster than the drum speed, as the empty core that is being wound fills with tape. Consequently, during the course of a winding operation the dancing arm 53 swings from an initial starting position at or near the stop 55' toward the rear stop 55 and then forward again toward the front stop 55', the tension on the tape meanwhile remaining substantially uniform. Thus the dancing roll mechanism functions also as a means for compensating for the speed variance between the portion of tape being fed past the pull drums and the advance portion being wound on an empty core.

If the tape breaks during winding, the dancing roll 52 is no longer restrained thereby so that the arm 53 is impelled by the counterweight 56 to swing clear back to the stop 55 at which point the counterweight actuates a switch 57 to stop the machine automatically. Thus the dancing roll additionally functions as an automatic means to stop the machine whenever the tape ceases to run as a continuous web between the pull drums and the winding chucks, e. g., when it breaks.

From the dancing roll 52 the tape is next led around an idler roller 58 (tacky side in) and thence downwardly to the winding chucks, where the leading end is releasably anchored to the surface 59 by temporary adherence thereto.

Core supply

The empty spools or "cores" C-1, C-2, C-3, etc., on which the measured lengths of tape are to be wound, are delivered to the winding chucks through a supply chute 60 from an automatic hopper 61.

The hopper is equipped with a ram 62 which moves up and down between guides 63—63'. The ram is fastened to one side of an endless chain 64 which is moved up and down by the oscillation of a lower sprocket 65, produced by a crank, rack and pinion assembly 66 that is driven by the motor M' through a speed reduction unit 67.

The top of the ram carries a deep groove 62a slightly wider than the cores and of a depth approximately equal to their diameter. The groove is slanted at the same angle as the chute 60. The cores gravitate into the space between the guides, and when the ram comes up through the cores, some of them will align themselves in the groove on the ram. At the top of the stroke the groove becomes aligned with the chute whereupon the cores roll downwardly into the chute. At the lower forward end of the chute the leading core C-1 is releasably held by a lower lip member 68 and an upper spring member 68', in position to be seized and removed by the winding chucks (Figure 8).

Winding mechanism

Tape core holders are provided in the present embodiment in the form of chucks. Two opposed chuck heads 69 and 70 (Figure 9) are fixed on a common rotatable shaft 71, facing each other in spaced relation. Two chucks 72 and 72' are rotatably mounted on the face of the head 69 in spaced relation to each other and to the head's axis (the axis of the shaft 71), 180° apart in respect to the said axis and equidistant therefrom. An opposed set of two chucks 73 and 73' are rotatably mounted on the face of the opposite head 70, each chuck forming with the opposite chuck a coaxial pair between which a core may be held by pressure of the pair toward each other, the axes of the chucks and of the heads being parallel.

The chucks 72 and 72' are each slidable towards and away from the opposed chucks 73 and 73' so as alternately to grip and to release a core, and are idler chucks. The chucks 73 and 73' are power driven and serve as the driving chucks that rotate a core so as to wind tape thereon.

In Figure 9 the pair 72—73 are shown as being in the uppermost position which is the "core receiving station," and the pair 72'—73' in the lowermost position which is the "winding station." After a core held by the chucks 72'—73' has been filled, the heads 69 and 70 automatically turn or index in unison 180° so that the chucks 72'—73' are then up at the core receiving station and the chucks 72—73 which were receiving a core while the core in 72'—73' was being wound, are down at the winding station.

The faces of the idler chucks 72 and 72' carry cone shaped centering bosses 72a and 72a' to fit into the hole of a core and align it axially. The faces of the driving chucks 73 and 73' are of rubber.

The idler chuck 72 is fixed to a horizontal shaft 74. The shaft 74 is journaled in a housing 75 so that it can rotate but not slide axially therein. The housing 75 is keyed within the head 69 so that it can slide axially but not rotate therein. A spring 76 impels the housing 75 and with it the shaft 74 and chuck 72 towards the opposite chuck 73 sufficiently to hold a core between the chucks and cause the rotational impulse of the driving chuck 73 to be imparted to the core by the frictional contact between them. In other words, the chucks 72—73 are closed by the spring 76.

They are opened by an arcuate cam 77, which, as the heads 69 and 70 rotate counterclockwise, engages a small cam rider 78 that is rotatably mounted near the left end of the housing 75, thereby moving the housing leftwardly against the spring 76 and holding it there as long as the roller 78 rides along the left surface of the cam (Figures 1 and 9). The cam 77 is held in position by a sleeve 77a which is fixed to the framework of the machine coaxially with the chuck head shaft 71.

The cam first engages the rider to open the chucks and release the core that has just been filled about 10° after a pair of chucks leave the winding position. The cam continues to be in engagement until after the same pair of chucks reach the core receiving station, whereupon it disengages to permit the chucks to be closed by the spring 76 and to seize the empty core C-1 that is being releasably held by the core-holding members 68 and 68' at the delivery end of the core chute 60 (Figure 8).

The chuck 72' has parts corresponding to those of the chuck 72 described above including a cam rider corresponding to the rider 78, which, in alternation with 78, is engaged by the arcuate cam 77 as the heads 69 and 70 turn.

The driving chuck 73 is fixed on a shaft 80 which is journaled in the chuck head 70 in line with the shaft 74. The chuck 73' is similarly mounted on a shaft 80'. Clutch members 81 and 81' are fixed on the right ends of the chuck shafts 80 and 80' respectively. A complementary driving clutch 82 is positioned to engage each of the clutches 81 and 81' successively when they stop in the winding position, thereby to spin the core then being held by the corresponding chucks. The driving clutch 82 is mounted on a rotatably mounted shaft 83 which is continuously driven from the main power shaft 48 by a chain drive 84. The hub of the clutch 82 and the shaft 83 are splined so that the driving clutch 82 may be moved into and out of engagement with the chuck clutch 81' (or 81). This movement is accomplished by a solenoid 85 which operates through a clutch fork 86. The clutch 82 is held by the fork spring in a normally disengaged position. It is moved into engagement by the solenoid when the latter is energized.

In order to hold a core fixed against rotation about its own axis during a certain period, toothed wheels such as the gears 88 and 88' are fixed on the driving chuck shafts 80 and 80', respectively, and pawls 89 and 89' are pivotally mounted on the head 70 in position to engage the teeth of the gears. Spring members 90 and 90' normally impel the pawls into tooth engaging position thereby holding the shafts 80 and 80' fixed against rotation in either direction, but for a certain distance a cam 91 engages the adjacent pawl (89 or 89') as the chuck heads rotate, so as to withdraw that pawl from engagement with its gear and render the corresponding shaft, chuck and tape core free to rotate about their own axes in either direction (as illustrated by the pawl 89' in Figure 10).

The cam 91 first engages the pawl 89' when the parts are approximately at the position of Figure 11c. Prior thereto the core is held fixed so as to wrap the tape about itself as it moves downwardly from the position of Figure 11a. But at the approximate position of Figure 11c it is rendered free to turn, whereupon it slowly turns clockwise about its own axis due to the backward pull of the now stationary tape that occurs as the core continues to move downwardly, thereby striping the tape from its anchorage 59 and then wiping down the leading end of the tape by contact with the stationary tape wiping member 92 as the core moves past it, to form the initial wrap of tape about the core, smooth, undouble and unwrinkled (Figure 11d).

Immediately thereafter the heads come to rest with the core to which the leading end of the tape has just been adhered and which is held by the chuck 72', at the winding station (Figure 11e). The cam 91 continues to hold the pawl 89' out of engagement at this point so that the core may spin and thereby wind the tape T upon itself when the clutch 82 engages the clutch 81'.

After the desired length has been wound on and severed and the clutch 82 has disengaged, the chuck heads 69 and 70 begin to turn through the next cycle, but the cam 91 continues to engage the pawl 89' and hold the core free to spin until the periphery of the clutch head 81' has, in passing, made a brief tangential contact with the rubber periphery of a continuously rotating spinner wheel 93, after which the cam 91 ceases to engage the pawl 89'.

The clutch head 81' being the part of the core holding assembly through which the chucks are normally driven, this contact between it and the spinner wheel 93 has the effect of causing the filled core to spin momentarily in a counterclockwise direction. A movable wiping member 94 (hereinafter described) being then in contact with the periphery of the wound roll (the filled core), this spin has the effect of sealing down smoothly the trailing end of the cut length of tape that has just been wound on the core (Figure 12d).

Referring now to Figures 3 and 10, the spinner wheel 93 is fixed on a shaft 95 that is journaled in an arm 96. The arm pivots about a shaft 97 which is journaled in an upright frame member 98. An upright threaded stud 99 passes through an opening in the arm. A spring 100 on the stud bears downwardly against the top of the left end of the arm 96 and thereby impels the spinner wheel 93 into contact with the clutch head 81', the movement being limited to a desired distance by lock nuts positioned below the arm. The shaft 97 carries on its right end a sprocket that is driven by one side of the same chain 84 that drives the core driving clutch 82, and the shaft 95 is driven by the shaft 97 through gears 101.

*Tabbing mechanism*

Figure 13:
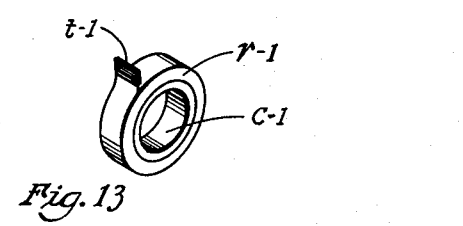
Figure 13 is a perspective view of a finished roll that has been wound by the illustrated machine.

The mechanism for providing a removal tab t-1 at the trailing end of a length of tape that has been wound on a core, to facilitate ready removal of the tape by a user (Figure 13), comprises guide means in the form of an elongate passageway or channel 103 which extends forwardly to a point between the chuck heads 69 and 70 where it curves down over the chuck head shaft 71. The non-adhesive tabbing tape t is withdrawn from a supply roll R' thereof and propelled through the channel by a rubber idler roller 104 above the tape and a rubber driving roller 105 below the tape, which project into the tape channel to press against each other with the tape t between them. A solenoid 106, acting through a reciprocating sliding arm 107 and pawl and ratchet 108, rotates the roller 105 counterclockwise to advance the tape the distance of one ratchet notch. A spring 109 returns the arm 107 and the pawl to their normal position (Figure 8) when the solenoid is deenergized.

The said advancement of the tabbing tape t causes it to advance beyond the forward end of the channel 103 until its leading end extends downwardly to a point in front of the stationary wiper 92 and behind the web of the adhesive tape T that is then being wound, adjacent the tacky side of the latter (Figure 12a). When the winding stops and a knife 111 moves in to cut the tape T, a sealing pad 112 which is carried on the knife assembly, contacts the non-tacky side of the adhesive tape slightly in advance of the knife and presses its tacky side against the back up plate and tape-anchoring surface 59 on the "nose" of the tabbing tape channel. The stock tape T and the tabbing tape $t$ are then closely adjacent, forming substantially a double web for the distance that the tabbing tape $t$ extends below the lower end of the surface 59 (Figure 12b). The knife then severs the two tapes by coacting with a shear block 113. The knife continues to move thereafter for a short distance past the shear into a recess 113a to press the tapes against the tab wiping member 92 to insure a contact between the newly severed length $t-1$ of tabbing tape and the tacky side of the adhesive tape T (Figure 12c). The core on the chuck 72' will then have the trailing end of the severed length of tape that has just been wound thereon, provided with a tab $t-1$ adhered thereto as shown on the roll $r-1$ in Fig. 13.

Cutting mechanism

Two sleeves 114 and 115 which rotate freely on a rigid shaft 116, carry a tape cutting assembly and a wiping assembly, respectively (Figures 14 and 15).

A knife arm 117 and a link 118 are fixed to the sleeve 114. A solenoid 119, acting through the link 118, impels the cutting assembly clockwise around the shaft 116 to the limit of its cutting stroke (Figure 12c). A spring 120 impels it counterclockwise to a point where the winding chucks will clear it when the chuck heads index (Figure 12e).

The knife 111 is fastened to a knife holding plate 121 with the knife edge at an angle to horizontal and to vertical planes determined by the cutting edge of the shear block 113. The plate is pivotally held at 122 to the top of the knife arm 117, with a spring 123 bearing against its outer end. These factors provide a tight point by point shearing contact between the knife and the shear across the full width of the tape.

The sealing pad 112 is mounted on the top of an arm 125 which is pivotally mounted on the knife arm 117. A spring 126 impels the arm 125 forward to such a point that the pad 112 is normally positioned in advance of the knife so as to anchor the tape to the surface 59 before the tape is cut, as shown in Figure 12b.

A spring-holding arm 127 is fixed to the sleeve 115, and a movable wiper or finger 94 is pivoted on the spring arm. A spring 129 carried by the spring arm 127 impels the wiping finger 94 clockwise away from the spring arm into contact with the roll that is being spun by the spinner wheel 93 in the position shown in Figure 12d, to press down the trailing end of the severed length of tape that has just been wound thereon. The wiping assembly is impelled counterclockwise around the shaft 116 to where the winding chucks will clear it when the chuck heads index (Figure 12e) by the cutting assembly through a rubber button 130 on the knife arm 117 which bears against the top of the spring arm 127 when the cutting assembly executes its above described counterclockwise movement around the same shaft 116.

From the full "open" position (shown in Figure 12e) the wiping and cutting assemblies are returned to their normal or operating positions (shown in Figure 12a) by a cam roller 131 (or 131') carried by the chuck head 70. After the chucks have cleared the said assemblies, the cam roller 131 (or 131') bears upon a cam 132 which is on the wiping assembly sleeve 115 thereby rotating the wiping assembly a short distance clockwise. The movement is transmitted to the cutting assembly through the button 130 against which the top of the spring arm 127 bears as the wiping assembly turns. When the indexing movement stops, the cam roller 131 (or 131') still engages the cam 132, thereby holding the wiping and cutting assemblies against the force of the spring 120 in the desired operating position shown in Figure 12a. After the core is wound the solenoid 119 is energized, thereby impelling the knife to execute its cutting stroke (Figures 12c and 14), and it remains energized until after the roll has been spun by the spinner wheel 93 (Figure 12d).

Figures 11e and 12a represent the same instant in a cycle.

Roll disposal and counting

Filled cores or "rolls," upon their release from the chucks, fall by gravity. They are assisted in this by pressure of the wiping member 94 so that the latter also functions as an ejector, but removal of the rolls may be by gravity alone and the ejecting action of the finger 94 may be dispensed with. From the chucks, the rolls fall through a jointed vertical chute 133 into a suitable container (Figure 16). A push-pull handle 133a connected to the jointed outlet of the chute, permits the deflection of occasional rejected rolls. The number of rolls is ascertained by counting the number of cycles of the machine. For convenience these are recorded by a counter 134 (Figure 3) which is connected into the circuit of the tabbing solenoid 106. Deflection of a reject by pulling the handle 133a actuates a cut out switch 135 in the counter circuit. The succeeding cycle then goes uncounted. Rejected rolls are thus not included in the number ultimately registered by the counter.

Indexing mechanism

After the core C-1 has been wound, the chuck heads 69 and 70 "index" or turn in unison 180° to bring the opposite pair of chucks, which have in the meantime seized the empty core C-2 from the core positioners 68 and 68', into winding position. This is accomplished by rotating the shaft 71 one half turn.

The rotating impulse comes from the continuously running counter shaft 48 through a variable speed changer 136, a speed reducer 137, an overload clutch 138, a Geneva movement having driving and driven wheels 139 and 140, respectively, and two spur gears 141 and 142 of one to two ratio, the smaller gear 142 being on the chuck head shaft 71 (Figure 1). The driving Geneva wheel 139 normally has a single driving pin or roller 143 (Figure 3). It will be seen that during 90° of rotation of the Geneva driver shaft 144, the chuck head shaft 71 will rotate or index 180°, and during the remaining 270° of rotation of the shaft 144, the chuck head shaft 71 is locked motionless by the Geneva movement during the "dwell" of the latter. The shaft 144 runs continuously.

Thus for each cycle of the machine, three-fourths of the time is available for winding and cutting, and one-fourth for indexing. This is ordinarily a workable ratio, but when winding very short rolls, e. g., 100'' and 120'' rolls, it is frequently advantageous to substitute a Geneva driver having two driving pins 180° apart instead of the one pin 143 which is on the illustrated driver 139, thereby providing as much time for indexing as for winding and cutting. This permits fast winding without running the parts that operate during indexing at excessive speeds.

*Timing mechanism*

A timing cam shaft 149 is driven by the shaft 144 and at the same speed, through bevel gears 150 (Figures 1 and 17). A second or upper cam shaft 151 is driven by the shaft 149 and at half the speed through spur gears 152.

The upper shaft carries four cams 145, 146, 147, and 148 which actuate four switches, 155, 156, 157 and 158, respectively. The lower shaft also carries four cams 145', 146', 147' and 148' which actuate four switches 155', 156', 157' and 158', respectively. The two sets of cams and switches are duplicates of each other except that the upper set of cams turns at half the speed of the lower set. When the Geneva driver 139 carries but the one roller 143, as in the illustrated machine, the upper set of switches is used and the lower set is disconnected. When a Geneva driver is substituted that carries two rollers, the lower set is then used and the upper set disconnected.

The switch 155 is a single pole double throw switch. It energizes the solenoids 50 and 85 which engage the pull drum clutch 46 and the winding clutch 82, respectively. The cam 145 is shaped so that for 180° of rotation of its shaft 151, one set of contacts of the single pole double throw switch 155 is made and the other broken and vice versa for the other 180°. The cam 145 is set so that the switch 155 trips when the roller 143 is just leaving one of the radial grooves of the driven Geneva wheel 140 and indexing of the chuck heads is completed.

The switch 156 is a single pole single throw switch. When it is open, the said solenoids 50 and 85 are thereby de-energized and the pull drum and winding clutches 46 and 82 disengaged. The cam 146 is shaped so that the switch 156 is open during the time the roller 143 is engaged with one of the slots of the driven Geneva wheel 140 and the chuck heads 69 and 70 are indexing or turning.

The switch 157 is a single pole single throw switch. It actuates the knife solenoid 119. The cam 147 is shaped so that the switch 157 is closed when the roller 143 is within approximately 10° of engaging a slot in the driven Geneva wheel 140 and kept closed until about 10° of turn after such engagement, i. e., after indexing begins.

The switch 158 is a single pole single throw switch. It energizes the tabbing tape solenoid 106. The cam 148 is shaped so that the switch 158 is closed when the roller 143 has indexed the chuck heads about 160°, and opened just before the indexing is completed.

Figure 18A:
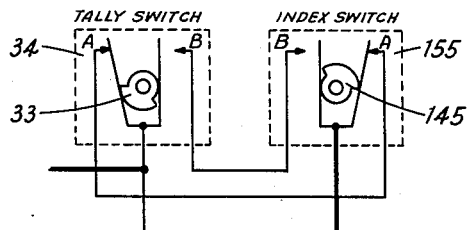
Figures 18a, 18b, 18c and 18d are diagrams showing the four successive combinations of the tally and indexing switches during the winding of two successive rolls.

At the moment indexing is completed, contacts A of the indexing switch 155 close and contacts B open. Since contacts A of the tally switch 34 are closed, the pull drum and winding solenoids 50 and 85 are energized and tape is wound on the core C-1 (Figure 18a).

Figure 18B:
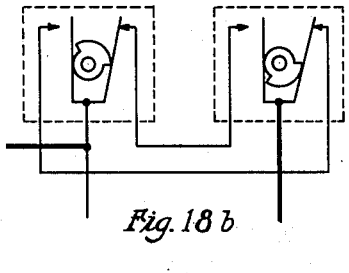

After a predetermined length of tape has passed over the tally wheel 18 and the cam 33 has rotated 180°, contacts A of tally switch 34 open and contacts B close but since the contacts of the indexing switch 155 remain the same, the solenoid circuit is broken and winding ceases (Figure 18b).

Figure 18C:
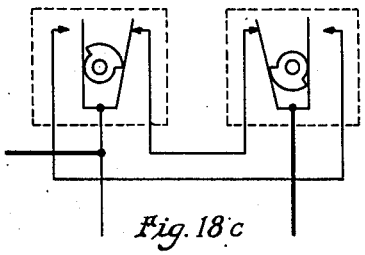

After the wound roll has been cut and tabbed, indexing again occurs. At the moment indexing is completed, contacts A of the indexing switch 155 open and contacts B close. Since contacts B of the tally switch 34 are closed, the pull drum and winding solenoids 50 and 85 are again energized and tape is wound upon the core C-2 (Figure 18c).

Figure 18D:
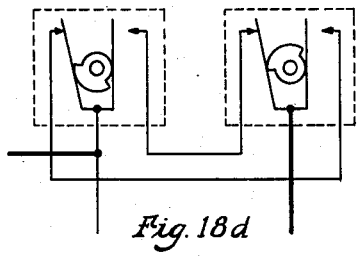

After the same predetermined measurement of tape has passed over the tally wheel 18 and the cam 33 has rotated 180°, contacts B of the tally switch 34 open and contacts A close but since the contacts of the indexing switch 155 remain the same, the solenoid circuit is broken and winding ceases (Figure 18d).

The cam 145 that operates the indexing switch 155 is driven continuously and the cycle continues to repeat itself.

*Circuits*

Figure 19:
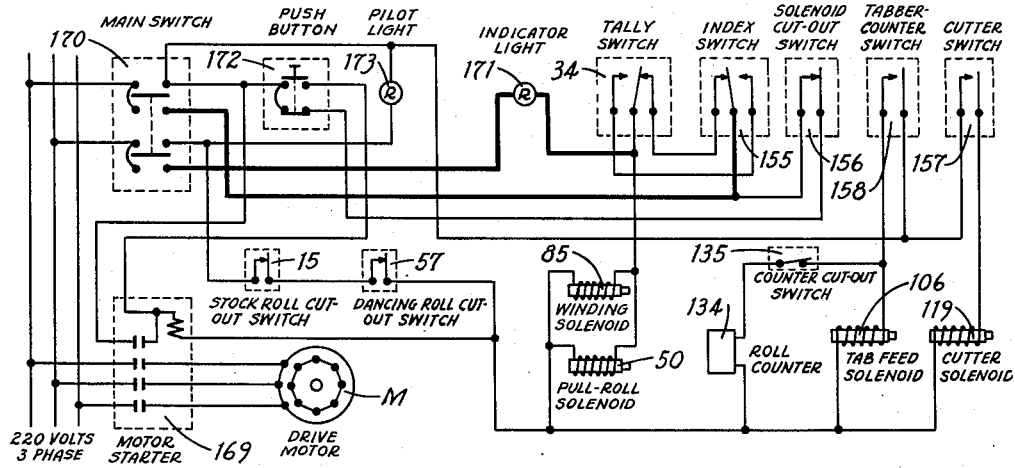
Figure 19 is a wiring diagram.

There are three principal circuits (Figure 19). One is a power circuit connecting the motor M through a motor starter 169 and a main switch 170 with a power line. The second is an indicator circuit, shown in heavy lines in Figure 19 and including an indicator light 171, to show the status of the solenoid switches. The third is a solenoid circuit. A push button 172 and a pilot light 173 are common both to the power and the solenoid circuits. All the circuits are energized from the one power line and all are connected and disconnected therefrom by the main switch 170.

*Operation*

Before starting the machine following a break in the tape or the insertion of a fresh supply roll R, in order to have the first roll a full roll the tally must first be reset at zero (after rethreading the machine) by pushing in and turning the knob 29 as far as it will go and then releasing it, as described hereinabove in the section on Tape Supply. The direction of its turn, however, will depend on the position of the tally and indexing switches 34 and 155. Whether the machine is threaded for a start by adhering the leading end of the tape to the anchoring surface 59 as shown in Figure 11a, or to the empty core that is in the upper chuck (chuck 72' in Figure 11a), indexing must occur before winding begins in order to bring the core into winding position (Figure 11e). To accomplish this, the switches 34 and 155 must be in the positions of Figures 18b or 18d when the machine starts.

To ascertain the position of the switches, the main switch 170 is thrown to the indicator circuit (shown in heavy lines in Figure 19). If the switches 34 and 155 are as in Figures 18a or 18c the indicator 171 will light. If the knob 29 is then pushed in and turned clockwise (the direction of turn of the tally cam 33 in operation) as far as it will go, the switch 34 will be thereby reversed so that the switches 34 and 155 will then be in their proper starting positions as shown in Figure 18b or 18d. But if they are already in the said starting position, the indicator 171 will not light, and they will be left that way if the tally is reset by turning the knob counter-clockwise.

After having thus reset the machine, the main switch 170 is thrown to connect the power line with the power and solenoid circuits. The pilot light 173 burns as long as the main switch 170 remains in this position. The starter button 172 is then pressed to energize the magnetic motor starter 169, thereby starting the motor M.

In changing from one length of tape to another, the speed of the indexing mechanism is adjusted by the variable speed changer 136 to make the dwell of the Geneva movement slightly greater than the time required to wind and cut the proposed length of tape at the speed for which the winding mechanism is then set. Thereafter the speed of the entire mechanism is adjusted by the variable speed changer 47 so as preferably to produce an approximate indexing time of one second. Greater or lesser speeds may be employed but an indexing time of one second or more is preferable in the particular machine here illustrated. For example, if 100" or 120" rolls are to be wound, after adjusting the time of the Geneva dwell (using a two pin Geneva driver) if the lineal speed of the tape is adjusted by the speed changer 47 to approximately 163 yards per minute, the indexing time will be approximately one second.

*Alternatives*

Numerous alternatives and equivalents will be apparent, all within the scope of the claimed invention. For example, the dancing roll assembly may be as in Figure 20 which shows a dancing roll 175 rotatably mounted on the side of a sliding block 176 which reciprocates in horizontal guideways 177, its reciprocal movement being limited in either direction by stops 178 and 178'. The block is impelled rearwardly against the pull of the tape T by a cable 179 that passes over a pulley 180, with one end attached to the block and the other to a counterweight 181.

A pointer 183 (Figure 2) on the reset tally knob 29 with suitable calibrations on the wall of the tally housing 19 to show the two zero points, may be substituted for the pins 37 and 37' and the arcuate slot 39 which are shown in Figure 7 as the illustrated means for resetting the cam 33 to either of its two starting or zero points.

As an alternative for the gears 88 and 88' and the pawls 89 and 89' for holding an empty core fixed when the initial wrap is being put on (Figures 10 and 11b), overrunning clutches may be inserted in each of the chuck shafts 80 and 80'. Such a construction is shown in Figures 21 and 22. The core chuck 73 is prevented from independent turning in one direction by the overrunning clutch 187 and in the other direction by the overrunning clutch 188. The desired counter clockwise turning (winding direction) of the chuck by force of the clutch member 81 when the latter is engaged by the previously described driving clutch 82, is permitted by a dog 189. The dog is screwed into the back of the clutch member 81 and has ears 189a which extend into the overrunning clutch and around the rollers 190. Upon counter clockwise rotation of the clutch member 81 and dog 189, the ears push the rollers 190 out of their wedged position, thus throwing out the overrunning clutch. At the same time the ears 189a bear against the member 191 so as to drive the shaft 80 and with it the core chuck 73 in the desired winding direction (counterclockwise).

In order to free a core for the brief period of clockwise turn necessary to wipe down the initial wrap (as shown in Figure 11d and as hereinabove described) when the overrunning clutch mechanism of Figures 21 and 22 is employed, a second core-opening cam 192 in addition to the main core-opening cam 77, is fixed to the inside of the cam-holding sleeve 77a in the approximate position indicated in Figures 23 and 24. The main cam 77 is of a thickness sufficient to open the core chucks far enough to receive or to drop a core. The second cam 192 is thick enough only to loosen the grip of the chucks on a core sufficient to allow the core to rotate within the chucks.

The tabbing mechanism may be actuated by mechanical contact during indexing as an alternative to the solenoid.

The tally wheel 18 here shown as contacting the tape before the latter reaches the pull drums, may instead be positioned after the drums if desired. Likewise the position of the guide 41 may also be changed, or additional guides be placed elsewhere.

A variety of sizes and types of tape may be wound on machines that are built according to the claimed invention, including dry, non-tacky or non-adhesive tapes.

The illustrated machine is designed to wind pressure-sensitive adhesive tape in widths varying from $\frac{3}{16}''$ to $\frac{3}{4}''$. In changing from one width to another, the bushing 185 in the chuck 73 is adapted to be replaced by a narrower or a wider bushing to change the spacing between the chucks 69 and 70 to fit the wider or the narrower tape, as the case may be, there being a similar changeable bushing in the chuck 73'. Machines may be constructed to wind tape in widths varying from $\frac{1}{8}''$ to at least 6".

The illustrated machine has cut and wound tapes of $\frac{5}{16}''$, $\frac{1}{2}''$ and $\frac{3}{4}''$ widths into rolls 100", 120", 180", 216", 300" and 360" in length. The minimum length would be approximately one wrap, e. g., approximately $4\frac{1}{2}''$ on a $1\frac{1}{16}''$ diameter core. The maximum length would depend on the maximum finished roll diameter for which the parts of the machine provide clearance. In the illustrated machine this is $1\frac{7}{8}''$. This would allow a 360" length roll of transparent cellulose pressure-sensitive adhesive tape on a $1\frac{1}{16}''$ diameter core. Machines of this invention may be constructed to wind rolls of any length although their greatest efficiency is in winding rolls of relatively short lengths, e. g., up to approximately 792 inches.

In the illustrated machine, 100", 120", 180", 216", 300" and 360" rolls are normally wound at the rate of 32, 27, 24, 22, 19 and 16 per minute, respectively. These rates, however, may be increased if desired. For example, 100" rolls have been wound at rates up to 54 rolls per minute for short periods of time.

The illustrated core holders or chucks are designed to hold cardboard cores of $1\frac{1}{16}''$ outside diameter and 1" inside diameter. In opening, each pair of chucks spreads or separates about $\frac{1}{4}''$ (in response to the cam 77) to admit or to drop out a core. Obviously the cores may vary widely both as to material, size and design, with corresponding variations in the design and type of the core holding means. The term "core" is intended to include spools, spindles, discs, cylinders or any element around which tape may be wound to form a roll thereof.

The size of the stock rolls may vary widely; 500 to 1500 yard stock rolls have been used.

It will be seen that the present invention provides machines which produce rolls at a speed relatively high in comparison with prior machines, and which, after being threaded and started, are substantially fully automatic and equipped with safety switches to stop the machine in the event of tape breakage or exhaustion of the tape supply, so that the process may be carried out with a minimum of manual attention, enabling one operator to attend to two or more machines at once.

We claim:

1. A tape winding machine comprising means for rotatably holding a tape roll core, means for holding a supply of tape, means for measuring the tape as it is withdrawn from the supply, means for releasably anchoring the leading end of a withdrawn unsevered length in a fixed position near the core holder, means for advancing the core holder to bring the periphery of the core into contact with the unsevered length at a point removed from the point of anchorage, means for rotating the core to wind tape onto the core, and means for severing the tape adjacent the core after a measured length has been wound on.

2. A tape winding machine comprising means for rotatably holding a tape roll core, means for feeding a succession of empty cores to the core holder, means for holding a supply of tape, means for withdrawing and advancing an unsevered length of tape toward the core holder, means for measuring the amount of tape that is advanced, means for releasably anchoring the leading end of the advanced unsevered length near the core holder, means for compensating for variance between the rate of feeding and the rate of winding and for maintaining an approximately uniform tension on the advanced unsevered length, means for advancing the core holder to bring the periphery of the core into contact with the advanced unsevered length at a point on the tape near the anchored end, means for holding the core fixed against rotation for a period during its continued advancement after contact with the tape, wiping means which the core engages as it continues to advance to wipe the leading end of the tape down around the core's periphery, means for rotating the core to wind tape onto the core, means for stopping the rotation when a measured length has been wound on, means for bringing the succeeding unsevered length of tape into engagement with the anchoring means, means for severing the tape between the anchoring means and the core, means for applying a tab to the trailing end of the cut length, means for wiping down the trailing end around the filled core, and means for releasing the filled core from the holder.

3. In a machine for winding lengths of tape from a supply thereof onto a succession of cores, a winding mechanism comprising a core holder mounted for rotation about its own axis, means for advancing the holder from a core receiving station along a path to a winding station, means for releasably anchoring the leading end of a withdrawn length of tape with the tape extending across the said path, means for rendering the holder fixed against rotation for a period during its said advancement after a core held thereby has contacted the tape, means for rendering the holder free to rotate for a later period during the advancement, a wiping member positioned to be contacted by the periphery of a core held by the holder during the said later period, and means for rotating the holder after it has arrived at the winding station to wind the tape on the held core.

4. The mechanism of claim 3 in which the means for rendering the holder fixed against rotation for a period and thereafter free to rotate comprises a toothed wheel connected with the holder and rotating therewith, a pawl for engaging the teeth, a spring means for holding the pawl normally engaged and a cam means positioned to move the pawl out of engagement upon contact of the pawl and cam during the advancement of the core holder along the said path.

5. The mechanism of claim 3 in which the core holder comprises a driving chuck mounted at one end of a shaft and a clutch member at the other, an idler chuck opposed to the driving chuck and coaxial therewith, the idler chuck being slidably mounted for reciprocal axial movement, spring means for impelling the idler chuck toward the driving chuck to hold a core between them; and in which the means for rendering the core holder fixed against rotation comprises two opposite overrunning clutches between the driving chuck and the clutch member with means on the clutch member for disengaging one overrunning clutch upon rotation of the clutch member in winding direction; and with a means for rendering a core free to rotate for a period during the said advancement comprising a cam for drawing the idler chuck against the spring away from the driving chuck a distance sufficient to loosen the core within the chucks.

6. The mechanism of claim 3 with means for stopping the rotation after a length of the stock tape has been wound on, and means for affixing a tab to the stock tape comprising means for holding a supply of tabbing tape, means for withdrawing and advancing a length thereof toward the unsevered stock tape, guide means for conducting the said length into a position adjacent the stock tape at the point of severance, and means for severing the two tapes.

7. In a machine for winding lengths of stock tape from a supply thereof onto a succession of cores having a core holder and a winding station, a tabbing mechanism comprising means for holding a supply of tabbing tape, means for intermittently withdrawing and advancing a relatively short length thereof toward the unsevered stock tape, a severing means in front of the said unsevered stock tape, a coacting severing means in the rear of the said stock tape, a tab wiping member adjacent the coacting severing means, guide means for conducting the advanced length of tabbing tape to a position between the stock tape and the said coacting severing means, and means for moving the severing means rearwardly to a point beyond the coacting severing means to sever the two tapes and press them against the tab wiping member.

8. The mechanism of claim 7 in which the means for intermittent advancement of the tabbing tape is actuated by a solenoid.

9. In a machine for winding lengths of tape from a supply thereof onto a succession of cores, a cutting and wiping mechanism comprising a knife arm pivotally mounted for oscillation toward and away from the tape, a wiping spring arm adjacent the knife arm pivotally mounted for oscillation toward and away from a wound roll of tape, a wiping member pivotally mounted on the spring arm for oscillation toward and away from the said roll, cam means for moving the spring arm about its pivot towards the roll into operating position, the said cam means serving also to hold the arm in the said position during its operation, a connection between the two arms for transmitting to the knife arm the movement of the spring arm into operating position, and a spring means on the spring arm for impelling the wiping member into contact with the wound roll when the spring arm is in the said operating position.

10. In a machine for winding lengths of tape from a supply thereof onto a succession of cores, a cutting mechanism comprising an arm mounted for reciprocal movement toward and away from the tape, a shear block mounted on the side of the tape opposite from the arm, a cutting blade pivotally mounted on the arm with its cutting edge at an angle to the edge of the shear block, spring means on the arm to bear the pivoted blade against the shear block when the two coact, a tape holding pad mounted on the arm adjacent the blade for reciprocal movement in relation to the arm toward and away from the tape, spring means for normally impelling the pad toward the tape to a point beyond the blade's cutting edge, a back up plate on the side of the tape opposite the pad, and means for moving the arm towards the tape to hold the tape between the pad and plate and thereafter to sever the tape.

11. The mechanism of claim 10 in which the means for moving the arm towards the tape is actuated by a solenoid.

12. In a machine for winding lengths of tape from a supply thereof onto a succession of cores, a winding mechanism comprising a core holder assembly mounted for rotation on its own axis, means for rotating the assembly to wind the tape on a core held thereby, means for stopping the rotation after a length has been wound on, means for severing the tape, a spinner wheel, means for rotating the spinner wheel, means for bringing the rotating spinner wheel and the core holder assembly into contact to rotate the latter a second time, and a wiping member bearing against the held core to wipe down the trailing end of the severed wound length during the second period of rotation.

13. The mechanism of claim 3 with means for stopping the rotation after a length of tape has been wound on, means for severing the tape, means for returning the holder thereafter to the core receiving station, a spinner wheel positioned to be contacted momentarily at its periphery by the holder assembly as the latter returns to the core receiving station, means for rotating the spinner wheel during the said contact, and a second wiping member positioned to bear against the filled held core during the said contact to wipe down the trailing end of the severed wound length.

14. In a machine for winding lengths of tape on a succession of cores having a rotatable core holder assembly and means for conducting the holder assembly along a path away from a winding station after winding, a spinner assembly for imparting a second rotation to the holder after the winding rotation comprising a power shaft, an arm pivotally mounted for movement about the axis of the power shaft, a spinner shaft journaled in the arm in spaced relation to the power shaft, parallel thereto and to the axis of the core holder, a driving connection between the power and the spinner shafts, a spinner wheel fixed on the spinner shaft in a position adjacent the said path of the holder assembly to effect a brief contact between the periphery of the spinner wheel and the holder assembly as the latter moves past the spinner wheel, and spring means for impelling the arm about the axis of the power shaft towards the said path.

15. In a machine for winding lengths of tape on a succession of cores, a rotatable chuck head, at least one core holder rotatably mounted on the head in spaced relation to the head's axis, the axes of the holder and of the head being parallel, indexing means for intermittently rotating the head to turn the holder successively to a core receiving station and thereafter to a winding station, winding means for rotating the holder about its own axis when it is at the winding station, a pull drum for withdrawing tape from a supply, a power source of rotational impulse, a countershaft, a variable speed connection between the power source and the countershaft for rotating the latter, a variable speed connection between the countershaft and the indexing means for rotating the latter, a constant speed connection between the countershaft and the pull drum, and a constant speed connection between the countershaft and the winding means.

16. In a machine for winding lengths of tape on a succession of cores having a winding clutch and a solenoid for engaging the winding clutch, a timing circuit and mechanism comprising a single pole double throw tally switch having stationary contacts A and B and a movable contact, a single pole double throw indexing switch having stationary contacts A and B and a movable contact, a connection between the two A contacts, a connection between the two B contacts, a connection between the movable contact of one switch and one pole of a power line, a connection between the movable contact of the other switch through the solenoid to the other pole of the line, a tally cam positioned to engage the movable contact of the tally switch, an indexing cam positioned to engage the movable contact of the index switch, the cams being shaped to leave both A contacts closed at the end of a given indexing movement, then to open the A contact and close the B contact of the tally switch at the end of the succeeding winding operation, then to open the A contact and close the B contact of the index switch at the end of the next succeeding indexing movement, and then to open the B contact and close the A contact of the tally switch at the end of the next succeeding winding operation.

17. The mechanism of claim 16 with a pull drum clutch and a solenoid for engaging the pull drum clutch, the said pull drum solenoid being connected in the circuit in parallel with the said winding clutch.

LEE S. WHITSON.
MATHIAS G. TOMETZ.
BERNARD G. FERLAAK, Jr.

References Cited in the file of this patent

UNITED STATES PATENTS

| Number | Name | Date |
|---|---|---|
| 1,262,671 | Howell | Apr. 16, 1918 |
| 1,265,329 | Henderson | May 7, 1918 |
| 1,467,841 | Cumfer | Sept. 11, 1923 |
| 1,829,286 | Long | Oct. 27, 1931 |
| 1,889,546 | Gates | Nov. 29, 1932 |
| 1,934,913 | Crisp | Nov. 14, 1933 |
| 1,958,068 | Raiche | May 8, 1934 |
| 1,963,327 | Hobart | June 19, 1934 |
| 1,966,525 | Schultz et al. | July 17, 1934 |
| 2,029,446 | Schueler | Feb. 4, 1936 |
| 2,059,398 | Roemer | Nov. 3, 1936 |
| 2,140,755 | Littell | Dec. 20, 1938 |
| 2,171,667 | Mickelson et al. | Sept. 5, 1939 |
| 2,200,000 | Johnstone | May 7, 1940 |
| 2,385,691 | Corbin et al. | Sept. 25, 1945 |
| 2,403,147 | Westergaard | July 2, 1947 |